United States Patent Office 3,166,551
Patented Jan. 19, 1965

3,166,551
PROCESS FOR THE PREPARATION OF 3-OXO-Δ⁴-6-METHYL STEROIDS
Derek Burn and Vladimir Petrow, London, England, assignors to The British Drug Houses Limited
No Drawing. Filed Dec. 19, 1962, Ser. No. 245,685
Claims priority, application Great Britain Jan. 2, 1962
8 Claims. (Cl. 260—239.55)

This invention relates to organic compounds and has particular reference to a process for the preparation of 3-oxo-Δ⁴-6-methyl steroids.

It is an object of the present invention to provide a new and improved process for the preparation of the therapeutically valuable 6α-methyl steroidal hormones of the androstane and pregnane series which are now well-known in clinical practice.

According to the present invention there is provided a process for the preparation of a 3-oxo-Δ⁴-6-methyl steroid which process comprises treating a corresponding 6-substituted steroidal-3,5-diene including the formula

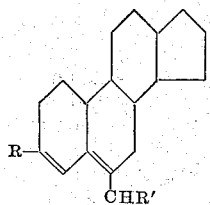

I where R is O-alkyl, O-hydroxyalkyl, O-cycloalkyl or O-alkaryl and R' is

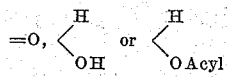

with an acidified metallic catalyst in the presence of at least one equivalent with respect to the steroid of a hydrogen donor in an organic solvent.

Palladium charcoal is the preferred metallic catalyst. Slight acidity of the "catalyst" is an essential feature of the present invention. Palladium charcoal as obtained from commercial sources is found by us to be sufficiently acidic in most cases to be satisfactory for the purpose of the invention. Should the catalyst be insufficiently acidic for the purpose of the invention, which will be apparent by the sluggishness of the reduction process, then it may be rendered suitable by addition of an acid such for example as acetic acid. The addition of acids such as acetic acid may in any event be advantageous in certain cases, such for example, as with 11-oxo compounds. Palladium on barium sulphate, when acidified with a small quantity of an acid such for example as acetic acid, may also be employed but is less effective than palladium charcoal, whilst platinum/carbon, ruthenium/carbon and rhodium/carbon are less satisfactory as the rate of reduction with them is too slow on a production scale.

Ethanol is the preferred organic solvent, but other hydroxylic solvents such as methanol and propanol, the lower ethers of ethylene glycol, p- and s-butanol may also be employed.

Cyclohexene is the preferred hydrogen donor. Other hydrogen donors which may be employed include such unsaturated hydrocarbons as cyclohexadiene, phellandrene, tetralin, benzyl alcohol and chemical equivalents thereof.

Conversion of compounds of Formula I into the 6-methyl products may lead to 6α-, 6β- or a mixture of 6α and 6β-methyl derivatives. In general, the 6α-methyl derivative admixed with smaller quantities of the 6β-methyl isomer will be obtained although in certain cases the 6β-methyl isomer may be formed in predominant amount. Conversion of the 6β-methyl isomer into the more stable 6α-methyl form may be readily achieved by methods of prior art such for example as treatment in ethanolic solution with catalytic quantities of hydrochloric acid or potassium hydroxide, conversion into the enamine or 3-enol ether and subsequent regeneration.

In the preferred embodiment of the invention to 1 part of the 3,5-dienic steroidal starting material in 10 to 20 vols. of ethanol is added 0.2 to 1 part palladium charcoal and 1 to 5 parts cyclohexene and the mixture heated under reflux for 1 to 3 hours. If desired, the requisite time of heating may be determined in a particular instance by removing an aliquot of the reaction solution, filtering to remove catalyst, and examining the resulting filtrate by U.V. or I.R. techniques. The time of reduction should not be prolonged unnecessarily as the resulting 6-methyl-3-oxo-Δ⁴-steroid hydrogenation product can undergo *slow* reduction under the experimental conditions which form the process of the present invention.

The starting materials

are described in our copending application No. 150,140, filed November 6, 1961, now U.S. Pat. No. 3,114,750. For their preparation the 3-enol ether of a 3-oxo-Δ⁴-steroid is treated e.g. with phosgene/dimethylformamide in methylene dichloride at 0° C. and the resulting mixture poured into aqueous sodium acetate when the 6-formyl steroid (I; R'=O) is obtained. Reduction of the 6-formyl steroid (I; R'=O) with, for example, a borohydride, furnishes the corresponding 6-hydroxymethyl steroid

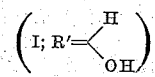

(application No. 150,176, filed November 6, 1961, now U.S. Patent No. 3,095,411). The starting materials

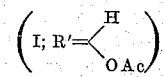

are prepared from the foregoing 6-hydroxymethyl steroids

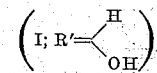

by cautious acylation in pyridine solution at room temperature, after which the mixture may be poured into cold water or brine and the precipitated products isolated by filtration. Such acylated materials are, in general, sufficiently pure for direct conversion into 6-methylated-3-oxo-Δ⁴-steroids. If desired, they may be purified by careful recrystallisation from neutral organic solvents preferably in the presence of a basic additive such as pyridine.

The process of the invention is generally applicable to 6-formyl, 6-hydroxymethyl and 6-acyloxymethyl steroids which may belong to the androstane, 19-norandrostane, 9β,10α-androstane, pregnane, 19-norpregnane, 9β,10α-pregnane, cholestane, stigmastane, ergostane or spirostane series. Such ring systems may additionally be substituted by the common functional groups encountered in steroidal chemistry including

*Hydroxyl and acyloxy groups* and functional derivatives thereof in such positions as 11, 12, 16 (including 16-hydroxy methyl), 14, 15, 17, 18, 19, 20 and 21 (including the condensation products of 16α, 17α-glycols with carbonyl components).

Carbonyl groups such for example as carbonyl groups at 11, 12, 15, 16, 17, 18 and 20.

Carbalkoxy groups at $C_{13}$, $C_{16}$, $C_{17}$ or in the sidechain.

Alkyl groups, in particular Me groups at $C_2$, $C_{11}$, $C_{16}$, $C_{17}$, $C_{21}$, and ethyl at $C_{17}$.

Alkenyl in particular vinyl and allyl at $C_{17}$.

Methylene and ethylidene groups at $C_{11}$, $C_{16}$ and $C_{17}$ groups such as benzylidene at $C_{21}$.

Lactone, ether and spiroketal residues: Spirolactone residues such as —O.CO.CH$_2$.CH$_2$— attached to $C_{17}$, etheric groups at $C_{16}$, and bridging $C_{18}$ and $C_{20}$, spiroketal moieties such as are present in diosgenone, 20,20-ethylenedioxy groups, 17,17-ethylenedioxy groups and similar functional derivatives.

Halogen groups and in particular fluorine at $C_9$ and $C_{16}$.

Unsaturated linkages in particular at $C_{9(11)}$, $C_{11}$, $C_{14}$, $C_{16}$ and $C_{17(20)}$.

Ketol groups in particular acylated ketol groups at $C_{16}$–$C_{17}$, $C_{17}$–$C_{20}$ and $C_{20-21}$.

Cortical side chains, both acylated, or converted into such "protective" derivatives as bismethylenedioxy, cyclic-carbonates, cyclic acetonides or orthoformates.

Epoxides particularly at $C_{16-17}$.

The process of the invention may be applied to the 3-enol ethers of 6-formyl, 6-hydroxymethyl and 6-acyloxymethyl derivatives of the following steroids and acyl derivatives thereof.

Testosterone
2-methyltestosterone
17α-methyltestosterone
9(11)-dehydro-17α-methyltestosterone
17α-acyloxyprogesterone
9(11)-dehydro-17α-acyloxyprogesterone
16-methyl-17α-acyloxyprogesterone
9(11)-dehydro-16-methyl-17α-acyloxyprogesterone
16-methylene-17α-acyloxyprogesterone
9(11)-dehydro-16-methylene-17α-acyloxyprogesterone
17α-acyloxy-16-ethylideneprogesterone
16α,17α-dimethylmethylenedioxyprogesterone
9(11)-dehydro-16α,17α-dimethylmethylenedioxyprogesterone
Cortisone
16-methylcortisone
21-methylcortisone
16-methylenecortisone
16α-hydroxy cortisone and the (16α,17α)-acetonide thereof
Hydrocortisone
16-methylhydrocortisone
21-methylhydrocortisone
16-methylenehydrocortisone
16α-hydroxyhydrocortisone and the (16α,17α)-acetonide thereof
17α,21-dihydroxypregna-4,9(11)-diene-3,20-dione
16-methyl-17α,21-dihydroxypregna-4,9(11)-diene-3,20-dione
21-methyl-17α,21-dihydroxypregna-4,9(11)-diene-3,20-dione
16-methylene-17α,21-dihydroxypregna-4,9(11)-diene-3,20-dione
16α-hydroxy-17α,21-dihydroxypregna-4,9(11)-diene-3,20-dione and the (16,17)-acetonide thereof
21-fluoro-17α-hydroxypregna-4,9(11)-diene-3,20-dione and the (16,17)-acetonide thereof
21-fluoro-17α-hydroxypregn-4-ene-3,11,20-trione and the (16,17)-acetonide thereof
21-fluoro-11,17α-dihydroxypregn-4-ene-3,20-dione and the (16-17)-acetonide thereof
21-hydroxypregna-4,17-dien-3-one
11-oxo-21-hydroxypregna-4,17-dien-3-one
11,21-dihydroxypregna-4,17-dien-3-one
9(11)-dehydro-21-hydroxypregna-4,17-dien-3-one
3-oxopregna-4,17-dienoic acid (esters)
3,11-dioxopregna-4,17-dienoic acid (esters)
11-hydroxy-3-oxopregna-4,17-dienoic acid (esters)
9(11)-dehydro-3-oxopregna-4,17-dienoic acid (esters)
21-fluoro-17α-acyloxyprogesterone
Progesterone
16-methylprogesterone
11-oxoprogesterone
9(11)-dehydroprogesterone
21-methylprogesterone
Diosgenone
17α-cyano-17β-hydroxyandrost-4-en-3-one
16-methyl-16,17-dehydroprogesterone
16-cyano-progesterone
16-carbalkoxyprogesterone
16-hydroxymethylprogesterone
3-(3-oxo-17β-hydroxyandrost-4-en-17α-yl)propionic acid
21-fluoroprogesterone
Testololactone
16-fluoro-corticoids The 9α-fluoro derivatives of the above 11β-hydroxy and 11-oxo-steroids.

Following is a description by way of example of methods of carrying the invention into effect.

Example 1

A mixture of 17β-acetoxy-6-hydroxymethyl-3-ethoxy-androsta-3,5-diene (0.5 g.), ethanol (10 ml.), cyclohexene (2 ml.) and 5% palladium on charcoal (0.15 g.) was stirred and heated under reflux for 2½ hours. The catalyst was removed by filtration and the clear solution was poured into water. The solid thus obtained was recrystallised from aqueous methanol to give 6α-methyltestosterone acetate, M.P. 140 to 141° C., identical with an authentic specimen.

Example 2

A mixture of 17α-acetoxy-6-acetoxymethyl-3-methoxy-pregna-3,5-dien-20-one (1 g.) [obtained as a gum by treatment of 17α-acetoxy-6-hydroxymethyl-3-methoxy-pregna-3,5-dien-20-one with acetic anhydride and pyridine (1:5) for 2 hours at room temperature], 5% palladium on charcoal (0.3 g.), ethanol (25 ml.) and cyclohexene (2 ml.) was stirred and heated under reflux for 1½ hours. The product, isolated as in Example 1, was purified from aqueous acetone. It had M.P. 206 to 209° C., and was identical with authentic 17α-acetoxy-6α-methylprogesterone.

Example 3

The Vilsmeier reagent was prepared at 0° C. from dimethylformamide (25 ml.) in anhydrous methylene chloride (50 ml.) and phosgene (16 g.) in methylene chloride (160 ml.). Cortisone acetate-3-enol methyl ether (Ercoli and Jardi, J. Amer. Chem. Soc., 1960, 82, 746) (25 g.) in methylene chloride (250 ml.) containing pyridine (0.5 ml.) was added and the mixture stirred for 2 hours, when an organge-red precipitate separated. Sodium acetate (30 g.) in water (100 ml.) and methanol (100 ml.) was added and the mixture stirred for 20 minutes then diluted with water and ether (600 ml.). The organic layer was washed with water until the washings were colourless, dried ($Na_2SO_4$), stirred with decolourising charcoal, filtered, and the solvents were removed under reduced pressure. The product, purified from aqueous methanol, was 21-acetoxy-6-formyl-17α-hydroxy-3-methoxypregna-3,5-diene-11,20-dione, flakes M.P. 200 to 204° C., $[\alpha]_D^{27}$ —15° (c., 0.97 chloroform), $\lambda_{max.}$ 218 ($\epsilon$=10,890) and 322 m$\mu$ ($\epsilon$=14,980).

A mixture of 21-acetoxy-6-formyl-17α-hydroxy-3-methoxypregna-3,5-diene-11,20-dione (0.5 g.) ethanol (20 ml.), acetic acid (10 ml.) cyclohexene (5 ml.) and 5% palladium on barium sulphate (0.5 g.) was stirred and heated under reflux for 3 hours. The product, isolated as in Example 1, was purified by crystallisation from 2-ethoxy ethanol. It had M.P. 240 to 242° C., and was identical with authenic 6α-methyl cortisone acetate.

Example 4

A mixture of 21-acetoxy-6-formyl-17α-hydroxy-3-methoxypregna-3,5-diene-11,20-dione (10 g.), ethanol (50 ml.), acetic acid (50 ml.), cyclohexene (10 ml.) and 5% palladium-charcoal catalyst (2 g.) was stirred and heated under reflux for 2 hours. The catalyst was removed by filtration, the filtrate diluted with water, and the product isolated with methylene chloride. The crude product was triturated with ether to give a crystalline solid which was purified from 2-ethoxyethanol. 6α-methylcortisone acetate, M.P. 240 to 242° C., was obtained, identical in every respect with an authentic specimen.

Example 5

A mixture of 21-acetoxy-6-formyl-3-methoxypregna-3,5-dien-20-one (1 g.), 5% palladium on charcoal (0.25 g.), cyclohexene (5 ml.), acetic acid (5 ml.) and ethanol (25 ml.) was heated under reflux for 3 hours. The product, isolated as in Example 4, was crystallised from aqueous methanol to give 21-acetoxy-6α-methylpregn-4-ene-3,20-dione as needles, M.P. 128 to 130° C., identical with an authentic specimen.

Example 6

A mixture of 3-ethoxy-6-formyl-16α,17α-isopropylidenedioxypregna-3,5-dien-20-one (1.5 g.), 5% palladium on charcoal (0.4 g.), cyclohexene (10 ml.) and ethanol (75 ml.) was heated under reflux for 2½ hours. The product, isolated as in Example 1, crystallised from aqueous methanol to give 6α-methyl-16α,17α-isopropylidenedioxypregn-4-ene-3,20-dione as leaflets, M.P. 166 to 167° C., identical with an authentic specimen.

Example 7

A mixture of 6-formyl-3-methoxypregna-3,5-dien-20-one (0.5 g.), 5% palladium on charcoal (0.15 g.), cyclohexene (1 ml.) and ethanol was heated under reflux for 2 hours. The product, isolated as in Example 4, crystallised from aqueous methanol to give 6α-methylpregn-4-ene-3,20-dione as needles, M.P. 122 to 123° C., identical with an authentic specimen.

Example 8

A mixture of 6-formyl-3-methoxyandrosta-3,5-dien-17-one (1 g.), 5% palladium on barium sulphate (0.4 g.), cyclohexene (2 ml.), acetic acid (10 ml.) and ethanol (20 ml.) was heated under reflux for 3½ hours. The product, isolated as in Example 4, was crystallised from acetone/hexane to give 6α-methylandrost-4-ene-3,17-dione as needles M.P. 167 to 168° C., identical with an authentic specimen.

Example 9

A mixture of 17β-acetoxy-3-ethoxy-6-formyl-2α-methylandrosta-3,5-diene (0.5 g.), 5% palladium on charcoal (0.15 g.), cyclohexene (1 ml.) and ethanol (10 ml.) was heated under reflux for 2 hours. The product, isolated as in Example 4, crystallised from aqueous acetone to give 17β-acetoxy - 2α,6α - dimethylandrost-4-en-3-one as rods, M.P. 134 to 136° C., identical with an authentic specimen.

Example 10

A mixture of 17α-acetoxy-6-hydroxymethyl-3-methoxy-16-methylenepregna-3,5-dien-20-one (0.5 g.), 5% palladium on charcoal (0.15 g.), cyclohexene (2 ml.) and ethanol (10 ml.) was heated under reflux for 3 hours. The product, isolated as in Example 1, was crystallised from methanol to give 17α-acetoxy-6α-methyl-16-methylenepregn-4-en-3,20-dione as needles M.P. 208 to 210° C., identical with an authentic specimen.

Example 11

A mixture of ethyl 3-ethoxy-6-formylpregna-3,5,17(20)-trien-21-oate (1 g.), 5% palladium on charcoal (0.3 g.), benzyl alcohol (2 ml.) and ethanol (25 ml.) was heated under reflux for 3 hours. The product, isolated as in Example 4, was crystallised from ethanol to give ethyl 6α-methyl-3-oxopregna-4,17(20)-dien-21-oate as needles, M.P. 158° C., identical with an authentic specimen.

Example 12

A mixture of 6-formyl-3-methoxy-16α,17α-methylenepregna-3,5-dien-20-one (0.5 g.), 5% palladium on charcoal (0.15 g.), cyclohexene (1 ml.) and ethanol (10 ml.) was heated under reflux for 2½ hours. The product, isolated as in Example 4, crystallised from hexane as prisms, M.P. 126 to 128° C., identical with an authentic specimen.

Example 13

A mixture of 17α-acetoxy-6-formyl-3-methoxypregna-3,5-dien-20-one (5 g.), 5% palladium on charcoal (1.5 g.), cyclohexene (5 ml.) and ethanol (100 ml.) was heated under reflux for 3 hours. More cyclohexene (2 ml.) was added, and the mixture refluxed for a further 1 hour. After removal of the catalyst, the product was isolated with ether, and its solution in methanol (50 ml.) treated with 3 drops of concentrated hydrochloric acid. The mixture was refluxed for 10 minutes and the product precipitated by the addition of water. Crystallisation from aqueous methanol gave 17α-acetoxy-6α-methyl progesterone, M.P. 206 to 208° C., not depressed in admixture with an authentic specimen.

Example 14

A mixture of 17β-hydroxy-6-hydroxymethyl-17α-methyl-3-methoxyandrosta-3,5-diene (1 g.), 5% palladium on charcoal (0.25 g.), cyclohexene (5 ml.), acetic acid (5 ml.) and ethanol (25 ml.) was heated under reflux for 3 hours. The product, isolated as in Example 1, was purified from aqueous methanol. It had M.P. 134 to 135° C., and was identical with authentic 6α,17α-dimethyltestesrone.

Example 15

A mixture of 17α-acetoxy-6-formyl-16α-methyl-3-methoxypregna-3,5-dien-20-one (0.5 g.), 5% palladium on charcoal (0.15 g.), cyclohexene (1 ml.) and ethanol (20 ml.) was heated under reflux for 3 hours. The product, isolated as in Example 4, was purified from aqueous ethanol to give 17α-acetoxy-6α,16α-dimethylpregn-4-ene-3,20-dione, M.P. 164 to 165° C., identical with an authentic specimen.

Example 16

A mixture of 21-acetoxy-11β,17α-dihydroxy-6-hydroxymethyl-3-methoxypregna-3,5-dien-20-one (0.5 g.), ethanol (20 ml.), acetic acid (10 ml.), cyclohexene (5 ml.) and 5% palladium on barium sulphate (0.5 g.) was stirred and heated under reflux for 3 hours. The product, isolated as in Example 1, was purified from methanol. It had M.P. 208 to 211° C., and was identical with authentic 6α-methyl hydrocortisone acetate.

Example 17

A mixture of 17α-acetoxy - 21 - fluoro-6-formyl-3-methoxypregna-3,5-dien-20-one (1 g.), ethanol (25 ml.), acetic acid (10 ml.), cyclohexene (5 ml.) and 5% palladium on charcoal (0.5 g.) was heated under reflux for 2 hours. The product, isolated as in Example 4, was crystallised from acetone/hexane to give 17α-acetoxy-21-fluoro-6α-methyl progesterone, M.P. 198 to 200° C., identical with an authentic specimen.

Example 18

A mixture of 21-acetoxy-3-ethoxy-6-formyl - 17α - hydroxypregna-3,5-dien-20-one (0.5 g.), ethanol (20 ml.), acetic acid (5 ml.), cyclohexene (5 ml.) and 5% palladium on barium sulphate (0.5 g.) was heated under reflux for 3 hours. The product, isolated as in Example 1, was purified from methanol. It had M.P. 195 to 196° C., and was identical with authentic 21-acetoxy-17α-hydroxy-6α-methyl progesterone.

We claim:

1. A process for the preparation of a compound selected from the group consisting of 3-oxo-Δ⁴-6-methyl steroid compounds of the androstane, 19-norandrostane, 9β,10α-androstane, pregnane, 19-norpregnane, 9β,10α-pregnane, cholestane, stigmastane, ergostane and spirostane series comprising treating a 6-substituted steroidal-3,5-diene of said series having in Rings A and B of the steroid nucleus the structure

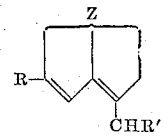

where Z represents the remainder of the steroid molecule, R is selected from the group consisting of O-alkyl, O-hydroxyalkyl, O-cycloalkyl and O-alkaryl and R' is selected from the group consisting of

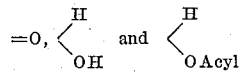

with an acidified metallic catalyst selected from the palladium and platinum group of metals in the presence of at least one equivalent with respect to the steroid of an unsaturated organic hydrogen donor in a hydroxylic organic solvent.

2. A process as claimed in claim 1 wherein the acidified metallic catalyst is palladium charcoal acidified with acetic acid.

3. A process as claimed in claim 1 wherein the metallic catalyst is palladium/barium sulphate acidified with acetic acid.

4. A process as claimed in claim 1 wherein the hydrogen donor is cyclohexene.

5. A process as claimed in claim 1 wherein the hydrogen donor is benzyl alcohol.

6. A process as claimed in claim 1 wherein the organic solvent is ethanol.

7. A process as claimed in claim 1 wherein the 6-substituted steroidal-3,5-diene in 10 to 20 vols. of ethanol is added to 0.2 to 1 part palladium charcoal and 1 to 5 parts cyclohexene and the mixture heated under reflux for 1 to 3 hours.

8. A process for the preparation of a compound selected from the group consisting of 3-oxo-Δ⁴-6-methyl steroid compounds of the androstane, 19-norandrostane, 9β,10α-androstane, pregnane, 19-norpregnane, 9β,10α-pregnane, cholestane, stigmastane, ergostane and spirostane series comprising treating a corresponding 3-enol ether substituted at C-6 with a member selected from the group consisting of formyl, hydroxymethyl, and acyloxymethyl with an acidified metallic catalyst selected from the palladium and platinum groups of metals in the presence of at least one equivalent with respect to the steroid of an unsaturated hydrocarbon hydrogen donor in a hydroxylic organic solvent.

No references cited.